(12) United States Patent
Fukuzumi et al.

(10) Patent No.: US 7,080,506 B2
(45) Date of Patent: Jul. 25, 2006

(54) EXHAUST GAS RECIRCULATION SYSTEM FOR INTERNAL COMBUSTION ENGINE

(75) Inventors: Masahiro Fukuzumi, Machida (JP); Yuichi Iriya, Yokohama (JP); Shinichi Okamoto, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/989,288

(22) Filed: Nov. 17, 2004

(65) Prior Publication Data

US 2005/0138918 A1 Jun. 30, 2005

(30) Foreign Application Priority Data

Dec. 24, 2003 (JP) .............................. 2003-426653

(51) Int. Cl.
*F02M 25/06* (2006.01)
(52) U.S. Cl. .............................. 60/278; 60/274; 60/299
(58) Field of Classification Search .................. 60/274, 60/278, 285, 299
See application file for complete search history.

(56) References Cited

U.S. PATENT DOCUMENTS 4,356,806 A * 11/1982 Freesh ................... 123/568.12
5,357,936 A    10/1994 Hitomi et al.
5,509,394 A *  4/1996 Hitomi et al. ............ 123/559.1
5,740,786 A *  4/1998 Gartner ................. 123/568.12

FOREIGN PATENT DOCUMENTS

| EP | 1493907 A2   | 1/2005 |
| JP | 3-74560 A    | 3/1991 |
| JP | 11-229973 A  | 8/1999 |
| JP | 2002-276405 A| 9/2002 |
| JP | 2003-83050   | 3/2003 |

* cited by examiner

*Primary Examiner*—Thomas Denion
*Assistant Examiner*—Diem Tran
(74) *Attorney, Agent, or Firm*—Shinjyu Global IP Counselors

(57) ABSTRACT

An exhaust gas recirculation system is configured to recirculate a large amount of exhaust gas to an engine intake passage while reducing contamination inside the intake passage caused by the recirculated exhaust gas and prevent damage to the intake passage caused by the heat of the recirculated exhaust gas. A first recirculation path recirculates exhaust gas from an upstream section of the exhaust passage located upstream of a catalytic converter unit. A second recirculation path recirculates exhaust gas from a downstream section of the exhaust passage located downstream of the catalytic converter unit. A control unit is provided that controls the switching of a selector valve between the first and the second recirculation paths based on the temperature of the recirculated exhaust gas.

19 Claims, 10 Drawing Sheets

CORRELATION MAP OF OPERATING REGION AND EXHAUST GAS RECIRCULATION STATE

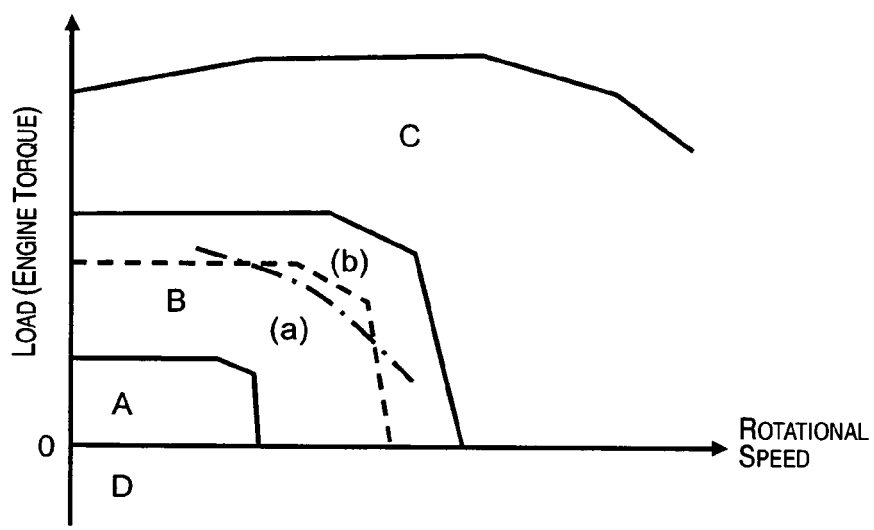

| | EXHAUST GAS RECIRCULATION | SECTION OF EXHAUST PASSAGE FROM WHICH EXHAUST GAS IS DRAWN |
|---|---|---|
| NEGATIVE TORQUE REGION D | No | -- |
| STRATIFIED COMBUSTION REGION A | Yes | DOWNSTREAM SECTION |
| HOMOGENEOUS COMBUSTION REGION B (a) | Yes | DOWNSTREAM SECTION |
| HOMOGENEOUS COMBUSTION REGION B (b) | Yes | UPSTREAM SECTION |
| HOMOGENEOUS COMBUSTION REGION C | NO | -- |

Fig. 3

EXHAUST GAS RECIRCULATION SYSTEM FOR INTERNAL COMBUSTION ENGINE

BACKGROUND OF THE INVENTION

1. Field of the Invention

The present invention relates to an exhaust gas recirculation system for an internal combustion engine. More particularly, the present invention relates to an exhaust gas recirculation system for an internal combustion engine having a catalytic converter provided in the exhaust passage.

2. Background Information

Exhaust gas recirculation systems configured to recirculate a portion of the exhaust gas from automobile engines and other internal combustion engines to the intake passage of the engine have been known for some time.

For example, the internal combustion engine disclosed in Japanese Laid-Open Patent Publication No. 2003-83050 is configured to recirculate exhaust gas from a portion of the exhaust pipe (exhaust passage) located downstream of the catalytic converter to the intake pipe (intake passage) using an EGR pipe (recirculation passage).

There are also automobile engines that are configured to recirculate exhaust gas from a portion of the exhaust passage located upstream of the catalytic converter to the intake passage.

By conducting exhaust gas recirculation and controlling a flow regulating valve installed in the recirculation passage, pump losses and cooling losses can be reduced and the ratio of specific heat can be increased. As a result, the fuel efficiency can be improved.

In view of the above, it will be apparent to those skilled in the art from this disclosure that there exists a need for an improved exhaust gas recirculation system. This invention addresses this need in the art as well as other needs, which will become apparent to those skilled in the art from this disclosure.

SUMMARY OF THE INVENTION

It has been discovered that in engines configured to improve fuel efficiency by recirculating exhaust gas drawn from a portion of the exhaust passage located upstream of the catalytic converter, the recirculated exhaust gas introduced into the intake passage has not passed through the catalytic converter and there is the possibility that the recirculated exhaust gas will react with blow-by gases and cause the intake passage to become contaminated.

Conversely, when the exhaust gas is drawn from a portion of the exhaust passage located downstream of the catalytic converter, the exhaust gas passes through the catalytic converter before it is recirculated to the intake passage and, thus, there is less contamination of the intake passage. However, the heat generated by the reactions inside the catalytic converter causes the temperature of the exhaust gas to become high and there are times when not much exhaust gas can be recirculated in view of the heat resistance of the intake passage and the heat resistance of the flow regulating valve provided in the recirculation passage, such as when the internal combustion engine is running under high load and high rotational speed conditions. In such cases, a chance to improve the fuel efficiency of the engine with increased exhaust gas recirculation is forfeited in order to protect the intake passage and the flow regulating valve from heat damage.

The object of the present invention is to provide an internal combustion engine configured to enable a large amount of exhaust gas to be recirculated to the intake passage while reducing contamination of the inside of the intake passage caused by the recirculated exhaust gas and preventing damage to the intake passage caused by the heat of the recirculated exhaust gas.

An exhaust gas recirculation system in accordance with the present invention is basically provided with an intake passage, an exhaust passage, a first recirculation path, a second recirculation path, a switching mechanism and a control unit. The exhaust passage is equipped with a catalytic converter. The first recirculation path extends from an upstream section of the exhaust passage positioned upstream of the catalytic converter to the intake passage. The second recirculation path extends from a downstream section of the exhaust passage positioned downstream of the catalytic converter to the intake passage. The switching mechanism is configured and arranged to selectively switch between a first recirculation state in which exhaust gas recirculation occurs via the first recirculation path and a second recirculation state in which exhaust gas recirculation occurs via the second recirculation path. The control unit is configured to control switching between the first recirculation state and the second recirculation state by the switching mechanism based on at least one parameter that correlates with exhaust gas temperature of the exhaust gas to be recirculated back to the intake passage.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 3 shows a correlation map of the engine operating region versus the exhaust gas recirculation state;

FIG. 6(*b*) is a simplified diagram of an exhaust gas recirculation system in accordance with a second embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
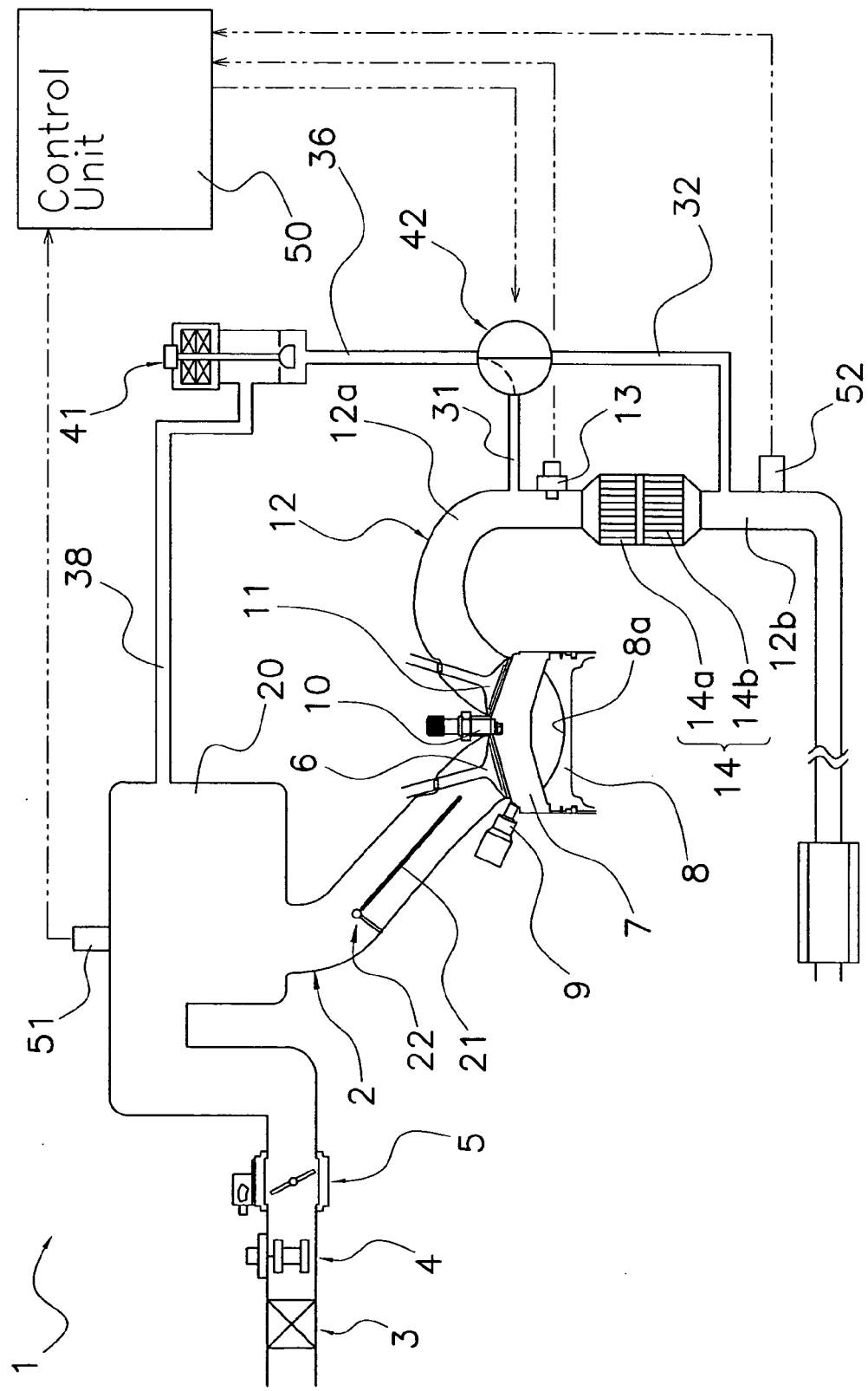
FIG. 1 is a schematic view of an internal combustion engine configured and arranged to include an exhaust gas recirculation system in accordance with a first embodiment of the present invention.

Referring initially to FIG. 1, an internal combustion engine 1 is illustrated that is configured and arranged to include an exhaust gas recirculation system in accordance with a first embodiment of the present invention. Basically, the engine 1 includes an intake passage 2, an air cleaner 3, an air flow meter 4, an electronically controlled throttle valve 5, a plurality of intake valves 6, a combustion chamber 7, a fuel injection valve 9, a spark plug 10, a plurality of exhaust valves 11, an exhaust passage 12, an exhaust gas air-fuel ratio sensor 13 and a catalytic converter unit 14. It will be apparent to those skilled in the art from this disclosure the engine 1 is provided with a plurality of combustion chambers 7 with each having a fuel injection valve, a spark plug, two intake valves and two exhaust valves even though only one combustion chamber is illustrated. Thus, for sake of simplicity, only one combustion chamber 7 and associated parts will be discussed and illustrated herein.

The exhaust gas recirculation system (discussed later) of this engine 1 has a pair of recirculation paths that are configured and arranged to selectively recirculate the exhaust gas back to the intake passage 2 from the exhaust passage 12, wherein the recirculated exhaust gas is extracted form a location either upstream or downstream of the catalytic converter unit 14 depending on a detected engine operation condition such as exhaust gas temperature. These two recirculation paths are basically formed by a plurality of recirculation passages 31, 32, 36 and 38 extending from the exhaust passage 12 to the intake passage 2, an EGR flow regulating valve 41, and a two-way selector valve 42. The control of the exhaust gas being recirculated back to the intake passage 2 from the exhaust passage 12 is controlled by the engine control unit 50.

The first recirculation path is a passage formed by passages 31, 36 and 38 that runs from an upstream section 12a of the exhaust passage 12 positioned upstream of the catalytic converter unit 14 to the intake passage 2 and serves to recirculate exhaust gas prior to treatment by the catalytic converter unit 14. The term "upstream section" as used herein refers to a section of the exhaust passage 12 positioned upstream of the catalytic converter unit 14. The second recirculation passage is a passage formed by passages 32, 36 and 38 that runs from a downstream section of the exhaust passage positioned downstream of the catalytic converter unit 14 to the intake passage and serves to recirculate exhaust gas. The downstream section as used herein refers to a section of the exhaust passage 12 positioned downstream of the catalytic converter unit 14. The two-way selector valve 42 forms a switching mechanism that is configured and arranged to switch between a first recirculation state and a second recirculation state. While two-way selector valve 42 is the switching mechanism of the first embodiment, it will be apparent from this disclosure that the switching mechanism can be made up of a single selector valve, a plurality of ON/OFF valves, or a combination of an ON/OFF valve and a check valve. The first recirculation state is a state in which recirculation of the exhaust gas takes place via the first recirculation path.

The second recirculation state is a state in which recirculation of the exhaust gas takes place via the second recirculation path. The control unit 50 controls whether the switching mechanism 42 establishes the first recirculation state or the second recirculation state based on a parameter or parameters that correlate to the temperature of the exhaust gas recirculated to the intake passage 2 as explained below. With the present invention, the recirculation passage used is switched in accordance with the heat resistance limit of the intake passage and other components.

In particular, the route or path by which the exhaust gas recirculates to the intake passage 2 is switched by the switching mechanism 42 based on selected operating conditions relating to the temperature of the exhaust gas recirculated to the intake passage 2. When the switching mechanism 42 is set such that the first recirculation state exists, exhaust gas is recirculated through the first recirculation path to the intake passage 2 before it passes through the catalytic converter unit 14. Consequently, although the recirculated exhaust gas has a comparatively low cleanliness level, it is lower in temperature than exhaust gas exiting the catalytic converter unit 14.

Meanwhile, when the switching mechanism 42 is set such that the second recirculation state exists, exhaust gas is recirculated through the second recirculation path to the intake passage 2 after it passes through the catalytic converter unit 14. Consequently, the recirculated exhaust gas has a comparatively high cleanliness level and is high in temperature due to the reactions that take place inside the catalytic converter unit 14. The control unit 50 controls the switching between the first recirculation state and the second recirculation state based on a parameter or parameters that correlate with the temperature of the recirculated exhaust gas.

When the exhaust gas temperature is low, the second recirculation state is established such that exhaust gas that has passed through the catalytic converter unit 14 and has a comparatively high cleanliness level is recirculated through the second recirculation path. Meanwhile, when the temperature of the recirculated exhaust gas increases to a point at which there is the possibility that the intake passage 2 will be damaged by the heat of the recirculated exhaust gas, i.e., when the parameter(s) that correlates with the temperature of the exhaust gas is in a prescribed range, the first recirculation state is established such that exhaust gas that has not yet passed through the catalytic converter unit 14 and has a lower temperature than exhaust gas that has passed through the catalytic converter unit 14 is recirculated through the first recirculation path, thereby maintaining the supply of recirculated gas to the intake passage.

With this control method, the default state is the second recirculation state (in which exhaust gas that has passed through the catalytic converter unit 14 and has a comparatively high cleanliness level is recirculated through the second recirculation path) and the first recirculation state (in which exhaust gas that has not yet passed through the catalytic converter and has a comparatively low temperature is recirculated to the intake passage through the first recirculation path) is used when there is the possibility that heat will damage the intake passage and other components. As a result, a large amount of exhaust gas can be recirculated to the intake passage while reducing contamination of the inside of the intake passage 2 caused by the recirculated exhaust gas and preventing damage to the intake passage 2 caused by the heat of the recirculated exhaust gas.

The control unit 50 preferably includes a microcomputer with an EGR control program that controls the exhaust gas being recirculated back to the intake passage 2 from the exhaust passage 12 by selectively operating the EGR flow regulating valve 41 and the two-way selector valve 42 as discussed below. The control unit 50 also preferably includes other conventional components such as an input interface circuit, an output interface circuit, and storage devices such as a ROM (Read Only Memory) device and a RAM (Random Access Memory) device. The microcomputer of the control unit 50 is programmed to control the operation of the EGR flow regulating valve 41 and the two-way selector valve 42. The control unit 50 is operatively coupled to the EGR flow regulating valve 41 and the two-way selector valve 42 in a conventional manner. The internal RAM of the control unit 50 stores statuses of operational flags and various control data. The internal ROM of the control unit 50 stores the control parameters for various operations including, but not limited to, operation of the EGR flow regulating valve 41 and the two-way selector valve 42. The control unit 50 is capable of selectively controlling any of the components of the control system in accordance with the control program as needed and/or desired. It will be apparent to those skilled in the art from this disclosure that the precise structure and algorithms for control unit 50 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The intake passage 2 is a passage through which intake air is drawn into the combustion chamber 7. The air cleaner 3, the air flow meter 4, and the electronically controlled throttle valve 5 are arranged in the intake passage 2. These parts are relatively conventional parts, and thus, these parts will not be discussed or illustrated in detail herein The air flow meter 4 is configured and arranged to produce a signal indicative of the intake air flowing in the intake passage 2 to the combustion chamber 7. The signal from the air flow meter 4 is fed to the control unit 50. The control unit 50 calculates the quantity of intake air being drawn into the combustion chamber 7 based on the signal from the air flow meter 4 and issues a control command to the electronically control throttle valve 5. The electronically controlled throttle valve 5 serves to regulate the quantity of intake air drawn into the combustion chamber 7 based on commands issued from the control unit 50.

The intake passage 2 includes an intake manifold 20 that receives recirculated exhaust gas from the recirculation passage 38, which is shared by both the first recirculation path and the second recirculation paths of the exhaust gas recirculation system (discussed later). The intake manifold 20 is preferably made of resin instead of metal in order to reduce its weight. Consequently, the maximum temperature that the intake manifold 20 can withstand is lower than in the case of an aluminum manifold.

Figure 2:
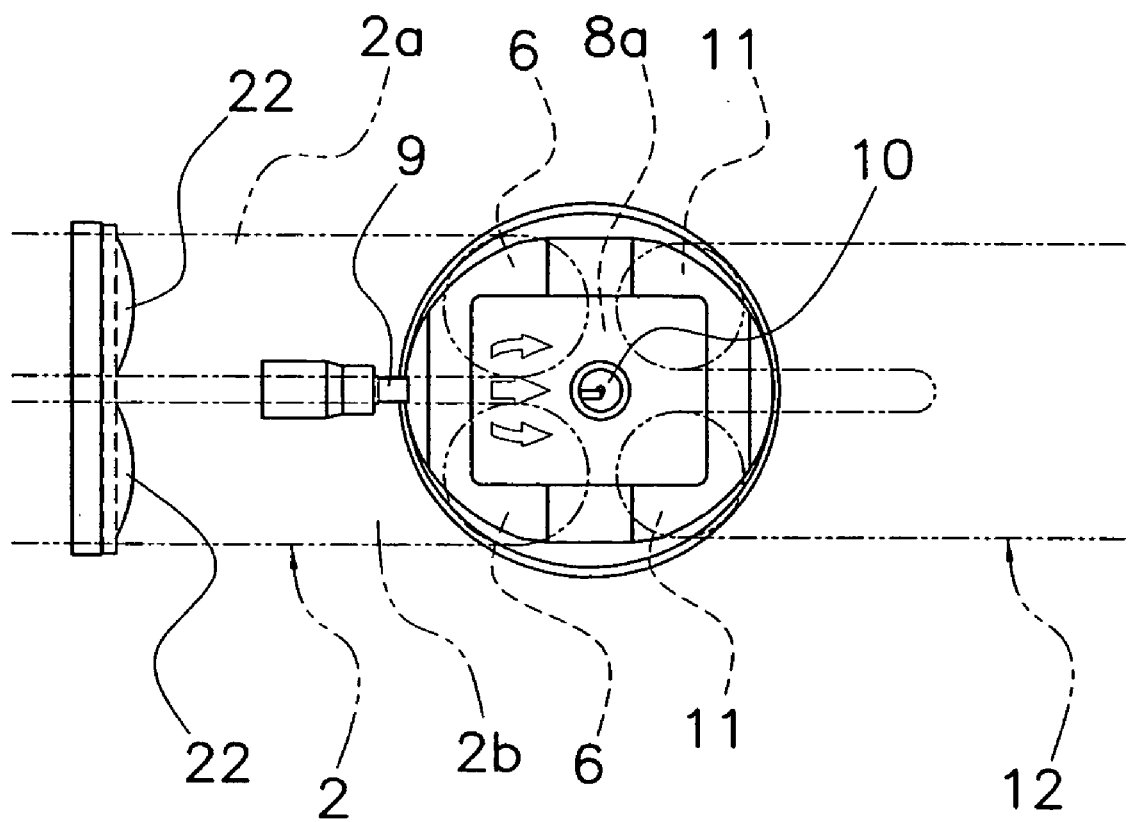
FIG. 2 is a simplified, partial top plan view of one of the combustion chambers of the internal combustion engine illustrated in FIG. 1.

As shown in FIG. 2, just upstream of the combustion chamber 7, the intake passage 2 is divided into a first intake port 2a and a second intake port 2b, both of which open into the combustion chamber 7. Each of the intake ports 2a and 2b is provided with a tumble control valve 22. Also provided in each intake port 2a and 2b is a dividing plate 21 that extends from the vicinity of the shaft of the tumble control valve 22 to toward the combustion chamber 7. The dividing plate 21 of each intake port 2a and 2b divides the internal space of the intake ports 2a and 2b into top and bottom sections, thereby dividing the internal spaces of the intake ports 2a and 2b into an upper passage and a lower passage. The lower passage is opened and closed by the tumble valve 22. When the tumble control valves 22 close the lower passages of the intake ports 2a and 2b, the tumbling flow of intake air inside the combustion chamber 7 strengthens.

The intake valves 6 introduce the air flowing through the intake passage 2 into the combustion chamber 7 at a prescribed timing. The intake valves 6 are driven by intake cams that are rotated in accordance with the rotation of the crankshaft (not shown) in a conventional manner.

The combustion chamber 7 is a space (variable volume area) formed by the bottom surface of the cylinder head, the inner wall surface of the cylinder, and the top surface of the piston 8. The piston 8 is arranged to move reciprocally along the inner wall of the cylinder and its top surface is provided with a cavity 8a in a conventional manner.

The fuel injection valve 9 and the spark plug 10 are provided in an upper portion of the combustion chamber 7. The spark plug 10 is arranged generally in the center of the upper part of the combustion chamber 7. The fuel injection valve 9 is arranged and configured to inject fuel directly into the cylinder (i.e., into the combustion chamber 7). A high-pressure fuel pump (not shown) pressurizes the fuel so that the fuel injection valve 9 can inject the fuel directly into the combustion chamber 7.

A fuel pressure sensor is provided in the high-pressure tubing that carries the fuel from the high-pressure fuel pump to the fuel injection valve 9 and is configured to feed a fuel pressure signal to the control unit 50. The control unit 50 controls the operation of the high-pressure fuel pump because the required fuel pressure varies depending on the engine operating conditions. The control unit 50 also receives signals from an accelerator position sensor, a crank angle sensor, and a coolant temperature sensor that send signals that are indicative of an accelerator pedal position or throttle valve opening, a crank angle and a coolant temperature, respectively, such that the current engine operating conditions of the engine 1 are detected. Based on the accelerator position signal, the crank angle signal, and the coolant temperature signal, the control unit 50 computes the required torque, the engine rotational speed, and the engine temperature and operates the fuel injection valve 9 and the spark plug 10 in accordance with the required torque and operating conditions of the engine 1.

After the engine 1 has warmed up, the control unit 50 controls the timing at which the fuel injection valve 9 injects the fuel in such a manner that stratified combustion is conducted inside the combustion chamber 7 when the load on the engine is low and homogeneous combustion is conducted when the engine load is not low.

During stratified combustion, the fuel injection valve 9 injects fuel during the compression stroke in such a manner that a comparatively large fuel-air mixture (agglomerate) is formed inside the cavity 8a of the piston 8 and the space there-above. The fuel-air mixture is concentrated around the spark plug 10 and there is a layer of space where no fuel exists around the outside of the fuel-air mixture. When the spark plug 10 is ignited and stratified combustion conducted from this state, extremely lean combustion is obtained and the fuel efficiency is improved. The operating region where stratified combustion is conducted (stratified combustion region) in this manner is the stratified combustion region A shown in FIG. 3 (discussed later).

Meanwhile, during homogeneous combustion, the fuel injection valve 9 injects fuel during the intake stroke and a homogeneous fuel-air mixture is formed throughout the entire combustion chamber 7. When combustion is conducted with a fuel-air mixture having a uniform air-fuel ratio in the combustion chamber 7, i.e., when homogeneous combustion is conducted, a higher output can be obtained than with stratified combustion. The operating regions where homogeneous combustion is conducted (homogeneous combustion regions) are the homogeneous combustion regions B and C shown in FIG. 3. As shown in FIG. 3, homogeneous combustion is generally used when the engine load is under medium to high loads.

The exhaust passage 12 serves as a passage through which gases remaining after combustion in the combustion chamber 7 are discharged as exhaust gas. The exhaust valves 11 arranged between the combustion chamber 7 and the exhaust passage 12 are driven by exhaust cams that are rotated in accordance with the rotation of the crankshaft (not shown) in a conventional manner. When the exhaust valves 11 open, the gases inside the combustion chamber 7 are routed through the exhaust passage 12 and discharged. Inside the exhaust passage 12 are arranged the exhaust gas air-fuel ratio sensor 13, the catalytic converter unit 14 for cleaning the exhaust gas, and an exhaust pressure sensor 52 for detecting the pressure of the exhaust gas. The catalytic converter unit 14 has a temperature sensor (not shown) installed therein. Data indicating the exhaust gas air-fuel ratio, exhaust gas pressure, and catalytic converter temperature detected by these sensors are fed to the control unit 50 as required. The control unit 50 computes the quantity of fuel to be injected from the fuel injection valve 9 in order to obtain the air-fuel ratio require, i.e., the output value of the exhaust gas air-fuel ratio sensor 13 required, for the exhaust gas to be cleaned. The control unit 50 is configured to determine the catalyst activity level of the catalytic converter unit 14 based on the catalytic converter temperature detected by the temperature sensor installed in the catalytic converter unit 14. The control unit 50 uses the pressure data measured by the exhaust gas pressure sensor 52 in controlling the two-way selector valve 42 (discussed later).

The catalytic converter unit 14 is preferably a tandem catalytic converter unit including an upstream oxidation catalytic converter 14a that has an oxidation catalyst that oxidizes, for example, CO and HC contained in the exhaust gas, and a downstream NOx trapping catalytic converter 14b that is configured to treat or absorb NOx in the exhaust gas. As exhaust gas passes through the catalytic converter unit 14, NOx components in the exhaust gas are deoxidized (reduction reaction) and hydrocarbons and carbon monoxide in the exhaust gas are oxidized, thereby cleaning the exhaust gas. The pressure of the exhaust gas that is in the upstream section 12a of the exhaust passage 12 and has not passed through the catalytic converter unit 14 (hereinafter called "upstream exhaust gas") is higher than the pressure of the exhaust gas that is in the downstream section 12b of the exhaust passage 12 and has passed through the catalytic converter unit 14 (hereinafter called "downstream exhaust gas") due to the pressure drop across the catalytic converter unit 14. Meanwhile, the temperature of the upstream exhaust gas is lower than the temperature of the downstream exhaust gas because the downstream exhaust gas has been heated by the chemical reactions that take place inside the catalytic converter unit 14.

The first and second recirculation paths of the exhaust gas recirculation system of the engine 1 are basically formed by a first recirculation passage 31, a second recirculation passage 32, and a pair of shared recirculation passages 36 and 38. The two-way selector valve (switching mechanism) 42 is installed between the shared recirculation passage 36 and the first and second recirculation passages 31 and 32 such that the first and second recirculation passages 31 and 32 are selectively connected to the shared recirculation passage 36 by the control unit 50. The EGR flow regulating valve 41 is installed between the shared recirculation passage 36 and the shared recirculation passage 38. The EGR flow regulating valve 41 is selectively controlled by the control unit 50.

The first recirculation passage 31 is provided for the purpose of recirculating upstream exhaust gas from the upstream section 12a of the exhaust passage 12 to the intake passage 2. Thus, the first recirculation passage 31 and is configured to extend toward the intake passage 2 from the upstream section 12a. The second recirculation passage 32, on the other hand, is provided for the purpose of recirculating downstream exhaust gas from the downstream section 12b of the exhaust passage 12 to the intake passage 2. Thus, the second recirculation passage 32 is configured to extend toward the intake passage 2 from the downstream section 12b. The ends of the first and second recirculation passages 31 and 32 are linked to the shared recirculation passages 36 and 38 through the two-way selector valve 42.

The two-way selector valve 42 is preferably a solenoid type valve configured to selectively switch between a first recirculation state in which the first recirculation passage 31 is put in communication with the shared recirculation passage 36 and a second recirculation state in which the second recirculation passage 32 is put in communication with the shared recirculation passage 36. When the two-way selector valve 42 is set to the first recirculation state in accordance with a command from the control unit 50, upstream exhaust gas is recirculated to the intake passage 2 through the shared recirculation passages 36 and 38 and downstream exhaust gas is blocked by the two-way valve 42. Thus, downstream exhaust gas is not allowed to flow from the second recirculation passage 32 to the shared recirculation passage 36. Meanwhile, when the two-way selector valve 42 is set to the second recirculation state, downstream exhaust gas is recirculated to the intake passage 2 through the shared recirculation passages 36 and 38 and upstream exhaust gas is blocked by the two-way valve 42. Thus, upstream exhaust gas is not allowed to flow from the first recirculation passage 31 to the shared recirculation passage 36.

The EGR flow regulating valve 41 is arranged between the shared recirculation passage 36 and the shared recirculation passage 38 and serves to regulate the amount of recirculated exhaust gas flowing into the intake passage 2 from the shared recirculation passages 36 and 38. The EGR flow regulating valve 41 is an electrically controlled valve whose valve body is driven electrically with a stepper motor. The valve opening thereof is determined by the total number of pulse signals (hereinafter called the "step count") sent to the stepper motor from the control unit 50. The stepper motors are also called "stepping motors," "step motors," and "pulse motors."

Based on the correlation map shown in FIG. 3 plotting the engine operating region versus the exhaust gas recirculation state, the control unit 50 controls the exhaust gas recirculation in accordance with the required torque (load) and the rotational speed of the engine 1. As a result, the exhaust gas recirculation is conducted as described below in each operating region.

Exhaust gas recirculation is not conducted in the negative torque region D of FIG. 3. Exhaust gas recirculation is conducted in the stratified combustion region A of FIG. 3. In region A, the two-way selector valve 42 is set to the second recirculation state, in which the second recirculation passage 32 is linked to the shared recirculation passage 36, so that the exhaust gas to be recirculated is drawn from the downstream section 12b of the exhaust passage 12. As a result, downstream exhaust gas is drawn from the downstream section 12b of the exhaust passage 12 and recirculated to the intake passage 2 through the shared recirculation passages 36 and 38.

Exhaust gas recirculation is also conducted in the homogeneous combustion region B of FIG. 3. When the engine 1 is operating in the sub-region (a) of the homogeneous combustion region B, i.e., when the combustion is homogeneous but the required load and the rotational speed are comparatively small, downstream exhaust gas is drawn from the downstream section 12b of the exhaust passage 12 in the same manner as when the engine 1 is operating in the stratified combustion region A. Meanwhile, when the engine 1 is operating in the sub-region (b), i.e., when the required torque and rotational speed of the engine 1 are comparatively large, upstream exhaust gas is drawn from the upstream section 12a of the exhaust passage 12. Exhaust gas recirculation is not conducted in the homogeneous combustion region C of FIG. 3.

When exhaust gas recirculation is conducted, the control unit 50 uses a control map (not shown) to determine the opening of the EGR flow regulating valve 41 based on the required torque and rotational speed of the engine 1 and sends a step count corresponding to the determined valve opening to the EGR flow regulating valve 41.

The control sequence executed by the control unit 50 to control the two-way selector valve 42 in order to conduct the exhaust gas recirculation described above will now be described with reference to the flowchart of FIG. 4.

First in step S1, the control unit 50 computes the pressure difference between the exhaust passage 12 and the intake passage 2. The pressure of the exhaust passage 12 is measured by the exhaust gas pressure sensor 52 installed in the downstream section 12b of the exhaust passage 12 and the pressure of the intake passage 2 is measured by the intake air pressure sensor 51 installed in the intake passage 2.

In step S2, the control unit 50 determines if the pressure difference between the exhaust passage 12 and the intake passage 2 is equal to or larger than a prescribed value. In this embodiment, the prescribed value is preferably a fixed value that does not change based on changes in the engine operating conditions.

If the pressure difference between the exhaust passage 12 and the intake passage 2 is smaller than the prescribed value in step S2, the control unit 50 proceeds to step S3. In step S3, the control unit 50 determines if the required amount of recirculation gas (hereinafter called "required recirculation gas quantity") is equal to or larger than a prescribed quantity. The required recirculation gas quantity is determined based on the required torque and the rotational speed of the engine 1.

If the required recirculation gas quantity is determined to be equal to or larger than the prescribed quantity in step S3, then the control unit 50 proceeds to step S4 where it controls the two-way selector valve 42 in such a manner that the first recirculation state is established, i.e., the first recirculation passage 31 is linked to the shared recirculation passage 36, and upstream exhaust gas is drawn from the upstream section 12a and recirculated to the intake passage 2.

Meanwhile, if, in step S2, the pressure difference between the exhaust passage 12 and the intake passage 2 is found to be equal to or larger than the prescribed value, the control unit 50 proceeds to step S5. The control unit 50 also proceeds to step S5 if the required recirculation gas quantity is found to be smaller than the prescribed quantity in step S3.

In step S5, the control unit 50 determines if the temperature of the exhaust gas recirculated to the intake manifold 20 of the intake passage 2 (hereinafter called "recirculated exhaust gas temperature") exceeds a maximum allowable temperature Tmax. More specifically, the control unit 50 determines if an estimated recirculated exhaust gas temperature, i.e., an estimate value of the actual recirculated exhaust gas temperature, exceeds the maximum allowable temperature Tmax.

The estimated recirculated exhaust gas temperature is a value estimated based on the rotational speed of the engine 1, the load of the engine 1, and the quantity (flow rate) of the recirculated exhaust gas, which are parameters that correlate with the actual temperature of the recirculated exhaust gas. The quantity of the recirculated exhaust gas is computed based on the pressure difference between the exhaust passage 12 and the intake passage 2 and the opening degree of the EGR flow regulating valve 41 (i.e., the step count issued to the EGR flow regulating valve 41). In short, the control unit 50 computes the estimated recirculated exhaust gas temperature based on parameters that correlate to the actual temperature of the recirculated exhaust gas (i.e., based on the rotational speed of the engine 1, the load of the engine 1, the negative intake air pressure of the intake passage 2, the exhaust gas pressure of the exhaust passage 12, and the opening degree of the EGR flow regulating valve 41) and determines if the estimated recirculated exhaust gas temperature exceeds the maximum allowable temperature Tmax in step S5.

The maximum allowable temperature Tmax is set based on consideration of the maximum withstandable temperature of the intake manifold 20 (which is where the recirculated exhaust gas is introduced into the intake passage 2) and is somewhat lower than the maximum withstandable temperature of the intake manifold 20.

If the estimated recirculated exhaust gas temperature is determined to exceed the maximum allowable temperature Tmax in step S5, the control unit 50 proceeds to step S4 in order to recirculate cooler exhaust gas from the upstream section 12a. More specifically, in step S4 the control unit 50 controls the two-way selector valve 42 in such a manner that the first recirculation state is established, i.e., the first recirculation passage 31 is linked to the shared recirculation passage 36, and upstream exhaust gas is drawn from the upstream section 12a and recirculated to the intake passage 2.

Meanwhile, if the estimated recirculated exhaust gas temperature is determined to be equal to or lower than the maximum allowable temperature Tmax in step S5, the control unit 50 proceeds to step S6 where it controls the two-way selector valve 42 in such a manner that the second recirculation state is established, i.e., the second recirculation passage 32 is linked to the shared recirculation passage 36, and downstream exhaust gas is drawn from the downstream section 12b and recirculated to the intake passage 2.

When the engine is operating in the stratified combustion region A or the comparatively low-load (low-required-torque) and comparatively low rotational speed of sub-region (a) of the homogeneous combustion region B, the control unit 50 of the engine 1 sets (controls) the two-way selector valve 42 such that downstream exhaust gas is drawn from the downstream section 12b and delivered to the intake passage 2 as recirculated exhaust gas. When the engine is operating in the portion of the homogeneous combustion region B (shown in FIG. 3) where the load and the required torque are larger than the boundary indicated with a dotted line, the required recirculated exhaust gas quantity is large and a sufficient pressure difference between the exhaust passage 12 and the intake passage 2 cannot be obtained if the exhaust gas for recirculation is drawn from the downstream section 12b. Thus, when the engine 1 is operating in this portion of the region B, the control unit 50 of the engine 1 sets the two-way selector valve 42 such that upstream exhaust gas from the upstream section 12a is recirculated to the intake passage 2 because the exhaust gas pressure is higher in the upstream section 12a than in the downstream section 12b. Furthermore, when the engine is operating in the portion of the homogeneous combustion region B (shown in FIG. 3) where the load and the required torque are larger than the boundary indicated with a single-dot chain line, the temperature of the recirculated exhaust gas flowing into the intake manifold 20 exceeds the maximum allowable temperature Tmax of the intake manifold 20 and there is a risk of damaging the intake manifold 20 if the exhaust gas for recirculation is drawn from the downstream section 12b. Thus, when the engine 1 is operating in this portion of the region B, the control unit 50 of the engine 1 sets the two-way selector valve 42 such that upstream exhaust gas from the upstream section 12a is recirculated to the intake passage 2 because the temperature of the exhaust gas is lower in the upstream section 12a than in the downstream section 12b. In short, the control unit 50 executes control such that the exhaust gas for recirculation is extracted from the upstream section 12a instead of the downstream section 12b when the engine is operating in the sub-region (b) of the homogeneous combustion region B shown in FIG. 3, where the sub-region (b) is the sum of the region where the load and the required torque are larger than the boundary indicated with the dotted line and the region where the load and the required torque are larger than the boundary indicated with the single-dot chain line.

First, the exhaust gas recirculation system of the engine 1 is configured such that exhaust gas recirculation from the exhaust passage 12 to the intake passage 2 can be conducted using either the first recirculation passage 31 to draw upstream exhaust gas from a section of the exhaust passage 12 where the exhaust gas has not yet passed through the catalytic converter unit 14 and the pressure of the exhaust gas is comparatively high or the second recirculation passage 32 to draw downstream exhaust gas from a section of the exhaust passage 12 where the exhaust gas has passed through the catalytic converter unit 14 and the pressure of the exhaust gas is comparatively low. Furthermore, recirculation of upstream exhaust gas to the intake passage 2 via the first recirculation passage 31 can be stopped by setting the two-way selector valve 42 to the second recirculation state, which is usually desirable because exhaust gas that has not passed through the catalytic converter unit 14 poses the risk of contaminating the intake passage 2.

Utilizing this exhaust gas recirculation configuration, the control unit 50 executes the determination operations of steps S2 and S3 and if it determines that a sufficient quantity of exhaust gas can be recirculated to the intake passage 2 by using the second recirculation passage 32 to draw downstream exhaust gas from the downstream section 12b of the exhaust passage 12 (where the exhaust gas has passed through the catalytic converter unit 14 and the pressure of the exhaust gas is comparatively low), it sets the two-way selector valve 42 such that the first recirculation passage 31 is closed and downstream exhaust gas having a comparatively high cleanliness level is recirculated to the intake passage 2 via the second recirculation passage 32 only. Conversely, if the control unit 50 determines that the pressure difference between the exhaust passage 12 and the intake passage 2 is insufficient, i.e., that a sufficient quantity of exhaust gas can not be recirculated to the intake passage 2 using the second recirculation passage 32 alone, it sets the two-way selector valve 42 to the first recirculation state such that upstream exhaust gas having a comparatively high pressure is recirculated to the intake passage 2 via the first recirculation passage 31. By controlling the exhaust gas recirculation system in this manner, contamination of the inside of the intake passage 2 is reduced because upstream exhaust gas from the upstream section 12a where the exhaust gas has not passed through the catalytic converter unit 14 is not used for recirculation when exhaust gas recirculation is conducted during low load and low rotational speed operating conditions. Meanwhile, during high load and high rotational speed operating conditions when a large quantity of recirculated exhaust gas is required, a large recirculated exhaust gas quantity can be secured by recirculating high-pressure upstream exhaust gas to the intake passage 2.

In other words, in comparison with engines in which the exhaust gas for recirculation is drawn entirely from the upstream section 12a of the exhaust passage 12, the engine 1 suppresses the development of gummy substances inside the intake passage 2 caused by the intermixing of recirculated exhaust gas and blow-by gas and almost eliminates the occurrence of such problems as valve sticking without taking any other preventive measures. Also, compared to engines in which the exhaust gas for recirculation is drawn entirely from the downstream section 12b of the exhaust passage 12, this engine 1 can secure a larger quantity of recirculated exhaust gas in operating regions of high load and high rotational speed and, thus, can improve the fuel efficiency.

Second, with the exhaust gas recirculating system of the engine 1 of the present invention, when the two-way selector valve 42 is set to the first recirculation state, the first recirculation passage 31 is used instead of the second recirculation passage 32 and upstream exhaust gas that has not passed through the catalytic converter unit 14 is recirculated to the intake passage 2 as recirculated exhaust gas. Consequently, the recirculated exhaust gas has a comparatively low cleanliness level because it has not passed through the catalytic converter unit 14 but has a lower temperature than exhaust gas that has passed through the catalytic converter unit 14. Meanwhile, when the two-way selector valve 42 is set to the second recirculation state, downstream exhaust gas that has passed through the catalytic converter unit 14 is recirculated to the intake passage 2 through the second recirculation passage 32. Consequently, the recirculated exhaust gas has a comparatively high cleanliness level and is high in temperature due to the reactions that take place inside the catalytic converter.

Figure 4:
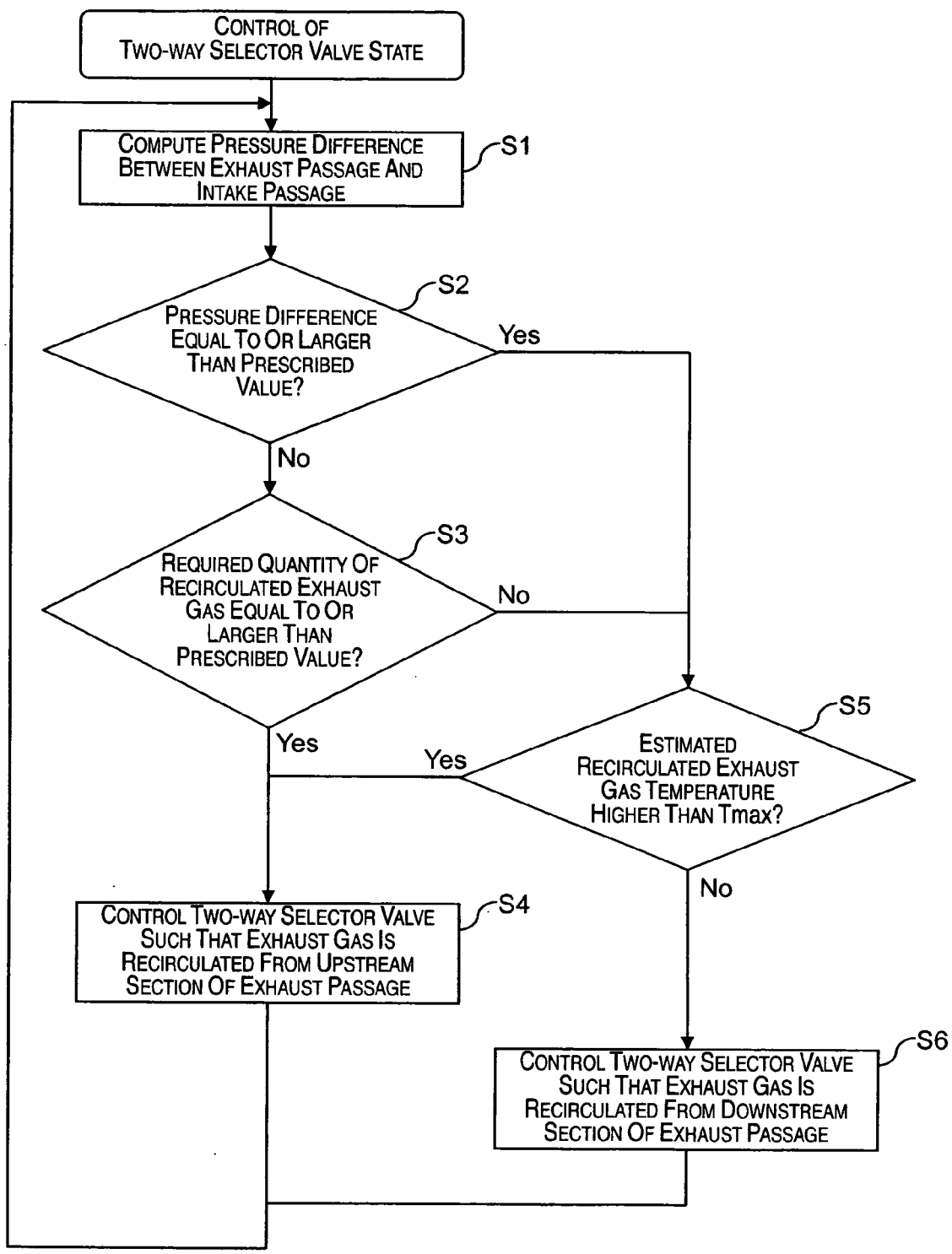
FIG. 4 is a flowchart showing the processing executed by the control unit in performing a switching control of the two-way selector valve.
Figure 5:
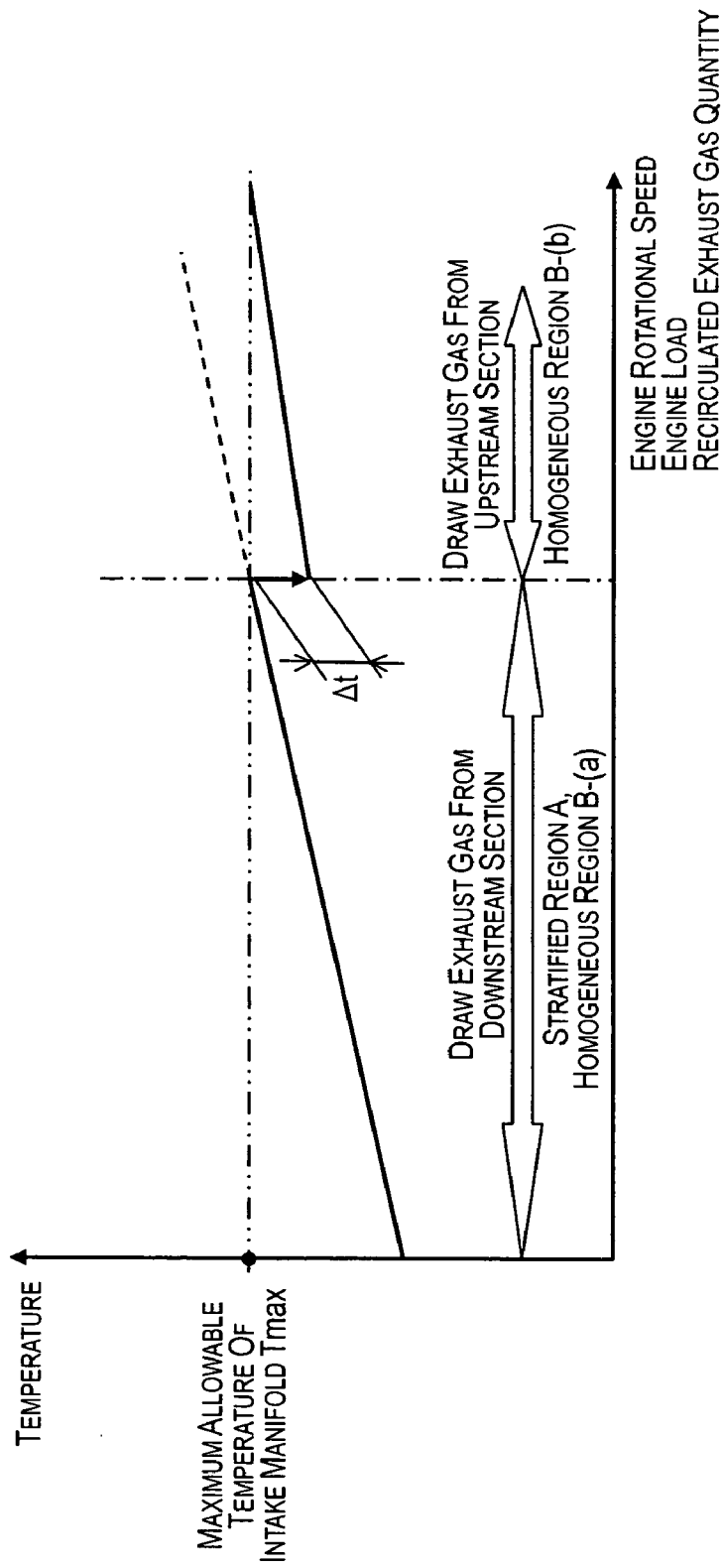
FIG. 5 is a graph showing the recirculated exhaust gas temperature versus the engine speed, engine load, and recirculated exhaust gas quantity.

Utilizing this exhaust gas recirculation configuration, the control unit 50 executes the determination operations of step S5 of FIG. 4 and if it determines that the estimated recirculated exhaust gas temperature is lower than the maximum allowable temperature Tmax of the intake manifold 20, then, as shown in FIG. 5, it sets the two-way selector valve 42 to the second recirculation state so that downstream exhaust gas that has passed through the catalytic converter unit 14 and has a comparatively high cleanliness level is recirculated via the second recirculation passage 32, thereby suppressing contamination of the intake passage 2. Conversely, if it determines that the estimated recirculated exhaust gas temperature is higher than the maximum allowable temperature Tmax, then the control unit 50 sets the two-way selector valve 42 to the first recirculation state so that upstream exhaust gas that has not passed through the catalytic converter unit 14 and whose temperature is lower than the temperature of exhaust gas that has passed through the catalytic converter unit 14 by an amount Δt is recirculated via the first recirculation passage 31. As a result, the resin intake manifold 20 of the intake passage 2 is prevented from being damaged by the heat of the recirculated exhaust gas and the supply of recirculated exhaust gas delivered to the intake passage 2 can be maintained even when the engine 1 is operating in the high-rotational-speed/high-load region located to the right of the boundary indicated with a single-dot chain line in FIG. 5.

Third, with the engine 1 of the present invention, the catalytic converter unit 14 comprises an upstream catalytic converter 14a and a downstream catalytic converter 14b. The first recirculation passage 31 of the exhaust gas recirculation system of the engine 1 is connected not between the two catalytic converters 14a, 14b, but to a portion of the exhaust passage 12 positioned upstream of the upstream catalyst 14a and downstream of the exhaust valves 11 with no other catalytic converters located there-between. In other words, the first recirculation passage 31 extends toward the intake passage 2 from the upstream section 12a of the exhaust passage 12.

Thus, when the two-way selector valve 42 is set to the first recirculation state, the pressure of the upstream exhaust gas recirculated to the intake passage 2 through the first recirculation passage 31 is higher than the pressure of the exhaust gas at any other position along the exhaust passage 12. As a result, even when the negative pressure of the intake air is small, the high exhaust pressure of the upstream exhaust gas enables the exhaust gas recirculated from the exhaust passage 12 to be pushed into the intake passage 2 so that the required quantity of recirculated exhaust gas can be delivered even if the requirement is large.

Additionally, when the two-way selector valve 42 is set to the first recirculation state, the temperature of the upstream exhaust gas recirculated to the intake passage 2 through the first recirculation passage 31 (recirculated exhaust gas temperature) is lower than the temperature of the exhaust gas at any other position along the exhaust passage 12. As a result, even when the temperature of the exhaust gas between the two catalytic converters 14a and 14b or downstream of the catalytic converter 14b exceeds the maximum allowable temperature Tmax of the intake manifold 20, upstream exhaust gas whose temperature does not exceed the maximum allowable temperature Tmax, i.e., exhaust gas from upstream of the catalytic converter 14a where the temperature does not exceed Tmax, can be delivered to the intake passage 2 as recirculated exhaust gas so that the required quantity of recirculated exhaust gas can be delivered even if the requirement is large.

VARIATIONS

Figure 6A:
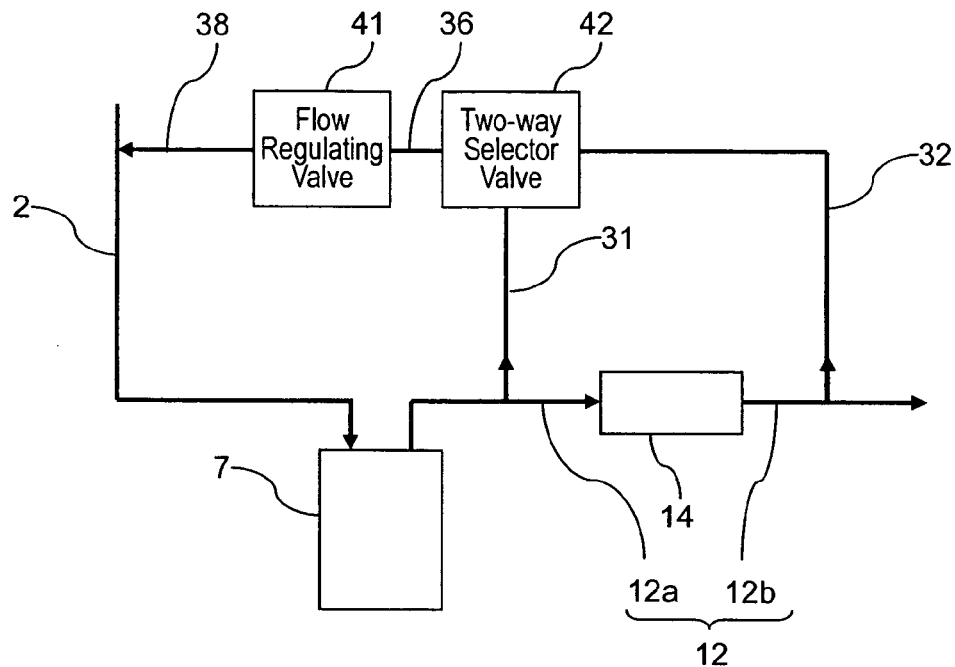
FIG. 6(*a*) is a simplified diagram of the exhaust gas recirculation system in accordance with the first embodiment of the present invention.
Figure 6B:
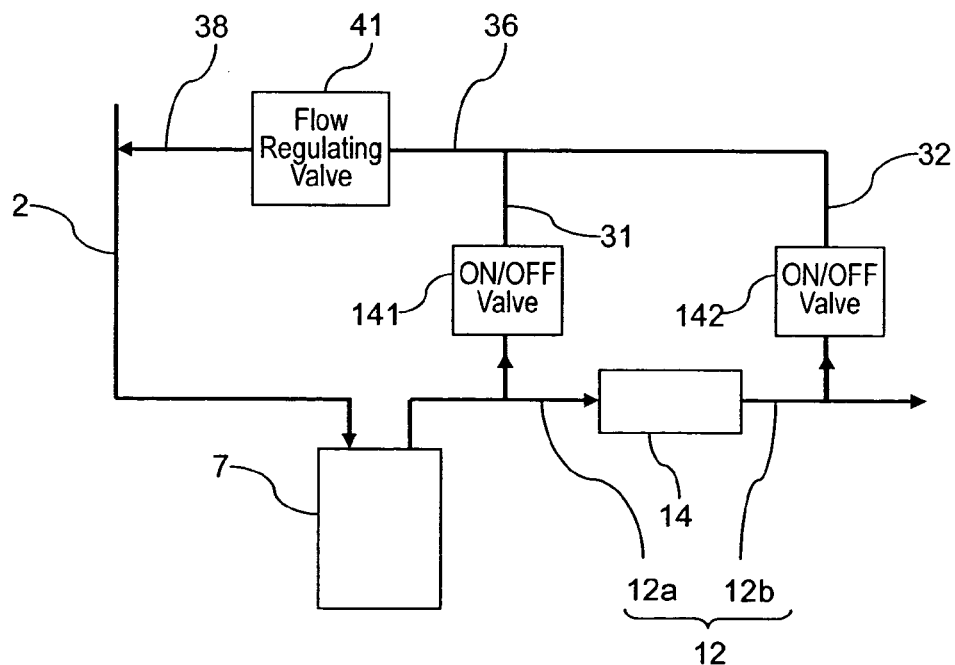

In the embodiment described heretofore, switching between recirculation of upstream exhaust gas from the upstream section 12a and recirculation of downstream exhaust gas from the downstream section 12b is accomplished using a two-way selector valve 42. Instead of a two-way selector valve 42, it is also acceptable to use two ON/OFF valves 141 and 142 provided in the recirculation passages 31 and 32 as shown in FIG. 6(b). For comparison, FIG. 6(a) provides a simple diagram of the exhaust gas recirculation system of the engine 1 presented in the first embodiment.

The first ON/OFF valve (a first part of the switching mechanism) 141 is provided in the first recirculation passage 31 and is configured such that it can block the recirculation of the upstream exhaust gas through the first recirculation passage 31. More specifically, the first ON/OFF valve 141 is an actuated valve that can switch between a closed state and an open state in accordance with commands issued from the control unit 50.

The second ON/OFF valve (a second part of switching mechanism) 142 is provided in the second recirculation passage 32 and is configured such that it can block the flow of the downstream exhaust gas through the second recirculation passage 32. More specifically, the second ON/OFF valve 142 is an actuated valve that can switch between a closed state and an open state in accordance with commands issued from the control unit 50.

Similarly to the exhaust gas recirculation system of the previous embodiment, an exhaust gas recirculation system provided with a switching mechanism comprising a first ON/OFF valve 141 and a second ON/OFF valve 142 can conduct exhaust gas recirculation from the exhaust passage 12 to the intake passage 2 using either the first recirculation passage 31 to draw upstream exhaust gas from a section of the exhaust passage 12 located upstream of the catalytic converter unit 14 or the second recirculation passage 32 to draw downstream exhaust gas from a section of the exhaust passage 12 located downstream of the catalytic converter unit 14. The upstream exhaust gas has not passed through the catalytic converter unit 14 and has a comparatively high pressure and a comparatively low temperature, and the downstream exhaust gas has passed through the catalytic converter unit 14 and has a comparatively low pressure and a comparatively high temperature. Thus, the variation provides an exhaust gas recirculation system having substantially the same characteristic features as the embodiment.

When the first ON/OFF valve 141 is opened and upstream exhaust gas is recirculated to the intake passage 2 via the first recirculation passage 31, it is desirable to close the second ON/OFF valve 142 so that the upstream exhaust gas from the upstream section 12a does not bypass the catalytic converter unit 14 and flow into the downstream section 12b.

Figure 7:
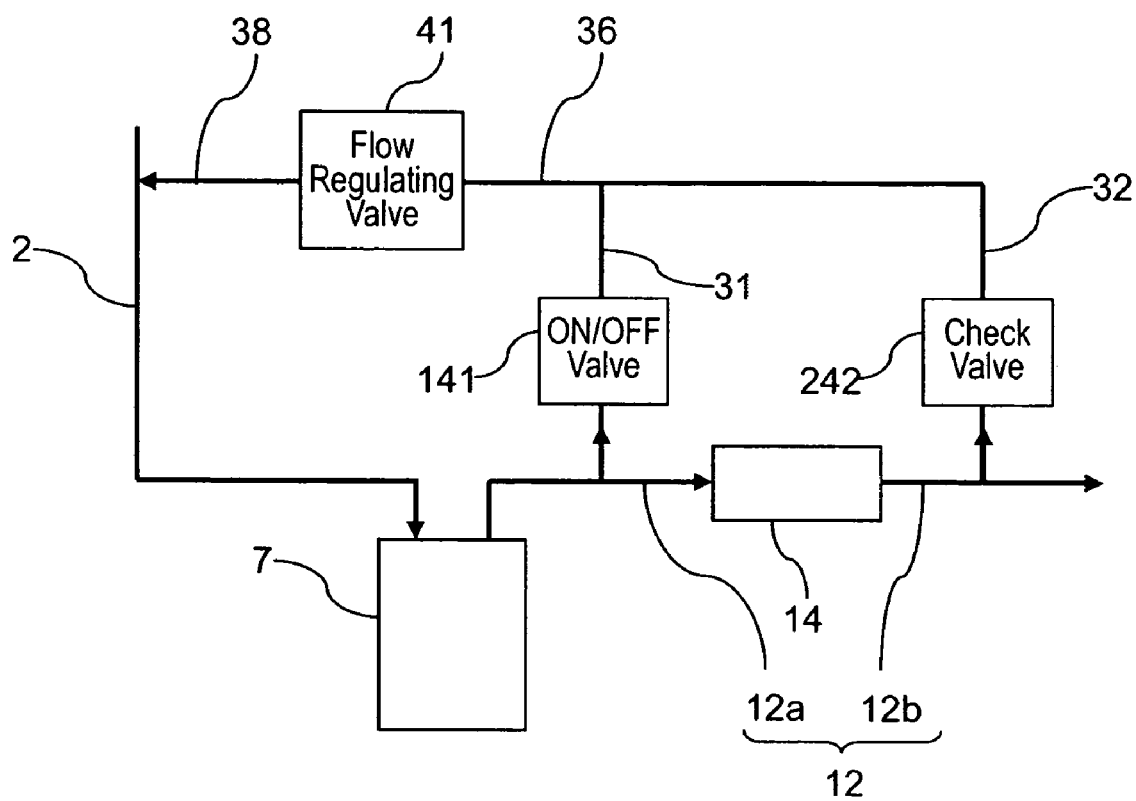
FIG. 7 is a simplified diagram of an exhaust gas recirculation system in accordance with a third embodiment of the present invention.

As shown in FIG. 7, a check valve 242 can also be installed in the second recirculation passage 32 instead of the second ON/OFF valve 142. Here, again, it is undesirable for the upstream exhaust gas drawn from the upstream section 12a to bypass the catalytic converter unit 14 and flow into the downstream section 12b.

Figure 8:
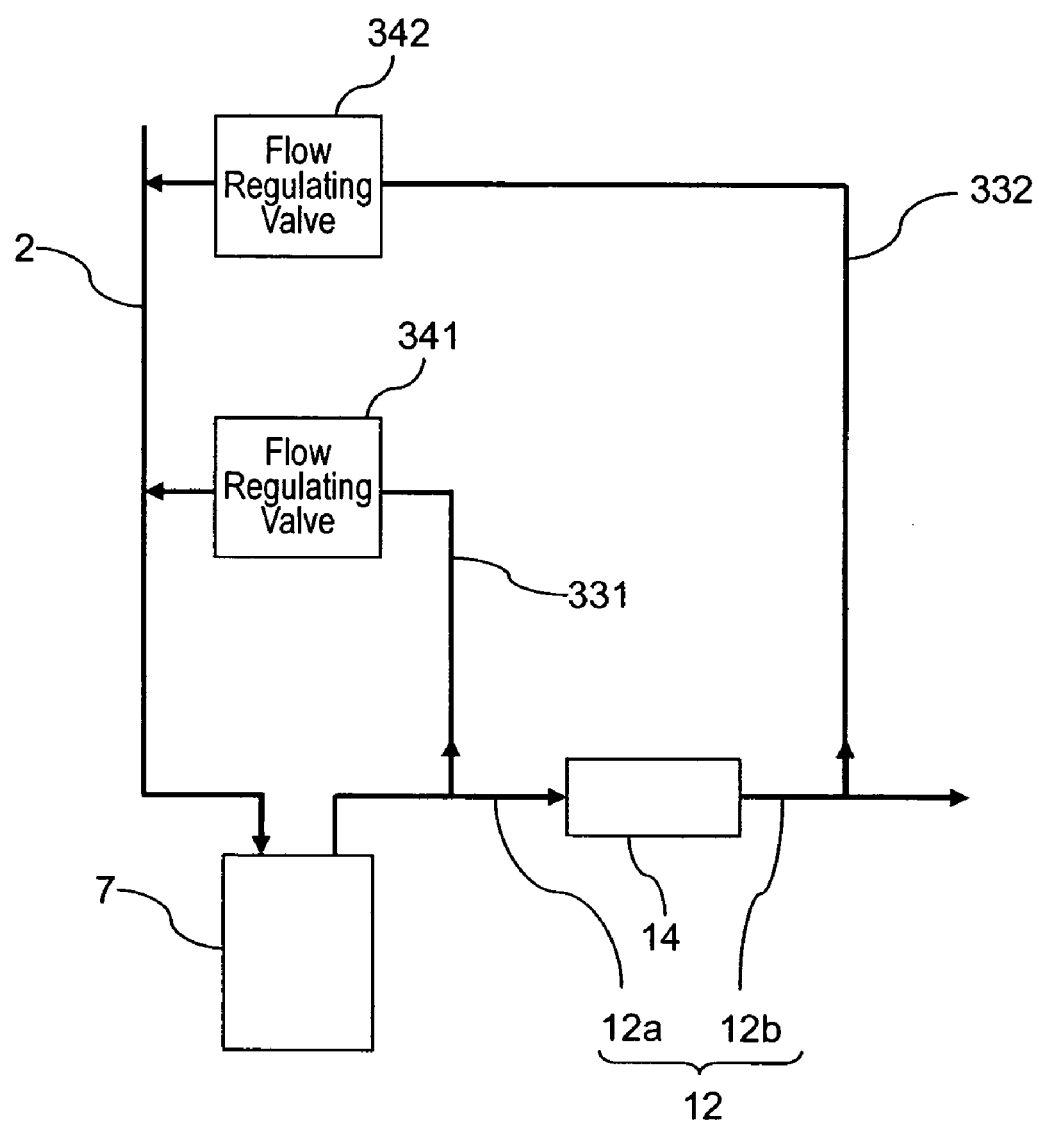
FIG. 8 is a simplified diagram of an exhaust gas recirculation system in accordance with a fourth embodiment of the present invention.

Although the previously described embodiment adopts a configuration in which the exhaust gas drawn from the exhaust passage 12 through the first recirculation passage 31 and the second recirculation passage 32 is fed to the intake passage 2 through the shared recirculation passages 36 and 38, it is also feasible to adopt the configuration shown in FIG. 8.

The exhaust gas recirculation system shown in FIG. 8 basically comprises a first recirculation passages 331, a second recirculation passage 332, a first EGR flow regulating valve (a first part of switching mechanism) 341, and a second EGR flow regulating valve (a second part of switching mechanism) 342.

First recirculation passage 331 is provided for the purpose of recirculating upstream exhaust gas from the upstream section 12a of the exhaust passage 12 to the intake passage 2 and is configured to extend from the upstream section 12a to the intake passage 2 such that the tip end thereof connects directly to the intake passage 2.

Second recirculation passage 332 is provided for the purpose of recirculating downstream exhaust gas from the downstream section 12b of the exhaust passage 12 to the intake passage 2 and is configured to extend from the downstream section 12b to the intake passage 2 such that the tip end thereof connects directly to the intake passage 2.

The first EGR flow regulating valve 341 is arranged in the first recirculation passage 331 and serves to regulate the amount of recirculated exhaust gas flowing into the intake passage 2 from the first recirculation passage 331.

The second EGR flow regulating valve 342 is arranged in the second recirculation passage 332 and serves to regulate the amount of recirculated exhaust gas flowing into the intake passage 2 from the second recirculation passage 332.

Similarly to the previous embodiment and variation, an exhaust gas recirculation device configured in this fashion can conduct exhaust gas recirculation from the exhaust passage 12 to the intake passage 2 using either the first recirculation passage 331 to draw upstream exhaust gas from the upstream section 12a or the second recirculation passage 332 to draw downstream exhaust gas from the downstream section 12b. Here again, the upstream exhaust gas has a comparatively high pressure, a comparatively low cleanliness level, and a comparatively low temperature and the downstream exhaust gas has a comparatively low pressure, a comparatively high cleanliness level, and a comparatively high temperature. This variation differs from the previous embodiment and variation in that it is also capable of drawing both upstream exhaust gas from the upstream section 12a and downstream exhaust gas from the downstream section 12b simultaneously. Additionally, the quantity of exhaust gas (recirculated exhaust gas quantity) recirculated via the first recirculation passage 331 and the quantity of exhaust gas recirculated via the second recirculation passage 332 can each be regulated independently.

Thus, this variation, too, provides an exhaust gas recirculation system offering substantially the same characteristic features as the embodiment.

Furthermore, the characteristic features of the previous embodiment, i.e., the effects of the invention, can still be obtained even if a small amount of recirculation through the first recirculation passage 331 occurs when downstream exhaust gas is being recirculated to the intake passage 2 using the second recirculation passage 332 or if a small amount of recirculation through the second recirculation passage 332 occurs when upstream exhaust gas is being recirculated to the intake passage 2 using the first recirculation passage 331.

Figure 9:
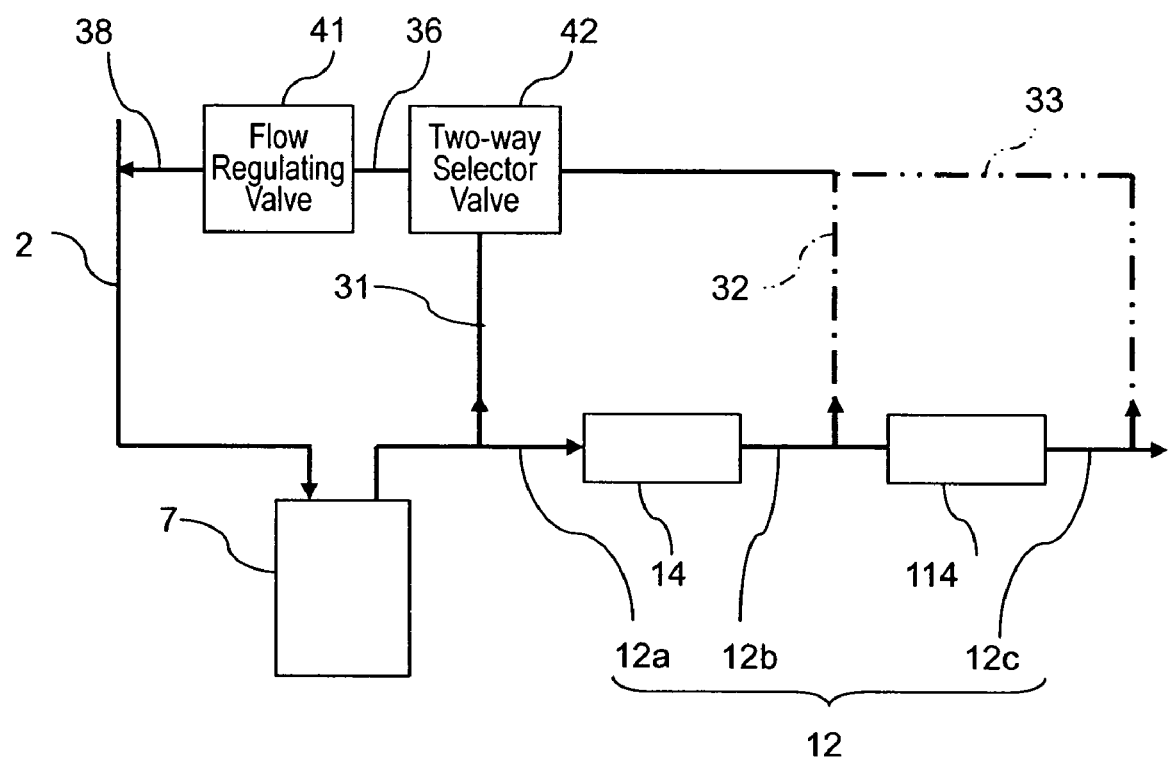
FIG. 9 is a simplified diagram of an exhaust gas recirculation system in accordance with a fifth embodiment of the present invention.

The previously described embodiment adopts a configuration in which a single catalytic converter unit 14 is arranged in the exhaust passage 12 and a two-way selector valve 42 is used to select whether the exhaust gas for recirculation is drawn from the upstream section 12a located upstream of the catalytic converter unit 14 or the downstream section 12b located downstream of the catalytic converter unit 14. There are cases, however, in which there are two catalytic converter units 14 and 114 arranged in the exhaust passage 12, as shown in FIG. 9. A desirable configuration to adopt in such a case will now be described.

As shown in FIG. 9, the catalytic converter unit 14 is located further upstream and the catalytic converter unit 114 is located further downstream. The exhaust gas recirculation system is configured such that exhaust gas can be drawn either from the upstream section 12a located upstream of the catalytic converter unit 14 or from the downstream section 12b or 12c located downstream of the catalytic converter unit 14. If the recirculation passage 32 indicated with a single-dot chain line in FIG. 9 is provided, exhaust gas for recirculation can be drawn from the downstream section 12b of the exhaust passage 12, which is located downstream of the catalytic converter unit 14 and upstream of the catalytic converter unit 114. Conversely, if the recirculation passage 33 indicated with a double-dot chain line in FIG. 9 is provided, exhaust gas for recirculation can be drawn from the downstream section 12c of the exhaust passage 12, which is located downstream of the catalytic converter unit 114.

Thus, substantially the same characteristic features as the exhaust gas recirculation system of the previously described embodiment can be obtained by arranging a two-way selector valve 42 such that it can switch between a state in which the first recirculation passage 31 is connected to the shared recirculation passages 36 and 38, which communicate with the intake passage 2, and a state in which either the recirculation passage 32 (indicated with single-dot chain line) or the recirculation passage 33 (indicated with double-dot chain line) is connected to the shared recirculation passages 36 and 38. In particular, when the two-way selector valve 42 is set such that it connects the first recirculation passage 31 to the shared recirculation passages 36 and 38, the exhaust gas that is recirculated from the upstream section 12a to the intake passage 2 through the first recirculation passage 31 has a higher pressure and a lower temperature than exhaust gas recirculated from the downstream section 12b or 12c of the exhaust passage 12 would have.

Although the previously described embodiment describes an exhaust gas recirculation system for an engine 1 configured to have an operating region in which stratified combustion is conducted in the combustion chamber 7 (stratified combustion region), the present invention can also be applied to an exhaust gas recirculation system for a multi point fuel injection (MPI) engine that does not have a stratified combustion region.

Furthermore, although the embodiment is configured to recirculate only exhaust gas from the downstream section 12b of the exhaust passage 12 when the engine is operating in the stratified combustion region, the present invention can also be applied to an exhaust gas recirculation system configured to switch between recirculation of exhaust gas from the upstream section 12a and recirculation of exhaust gas from the downstream section 12b while the engine is operating in the stratified combustion region. Such an exhaust gas recirculation system could become necessary in the future if engines are developed which required large quantities of recirculated exhaust gas in the stratified combustion region.

Figure 10:
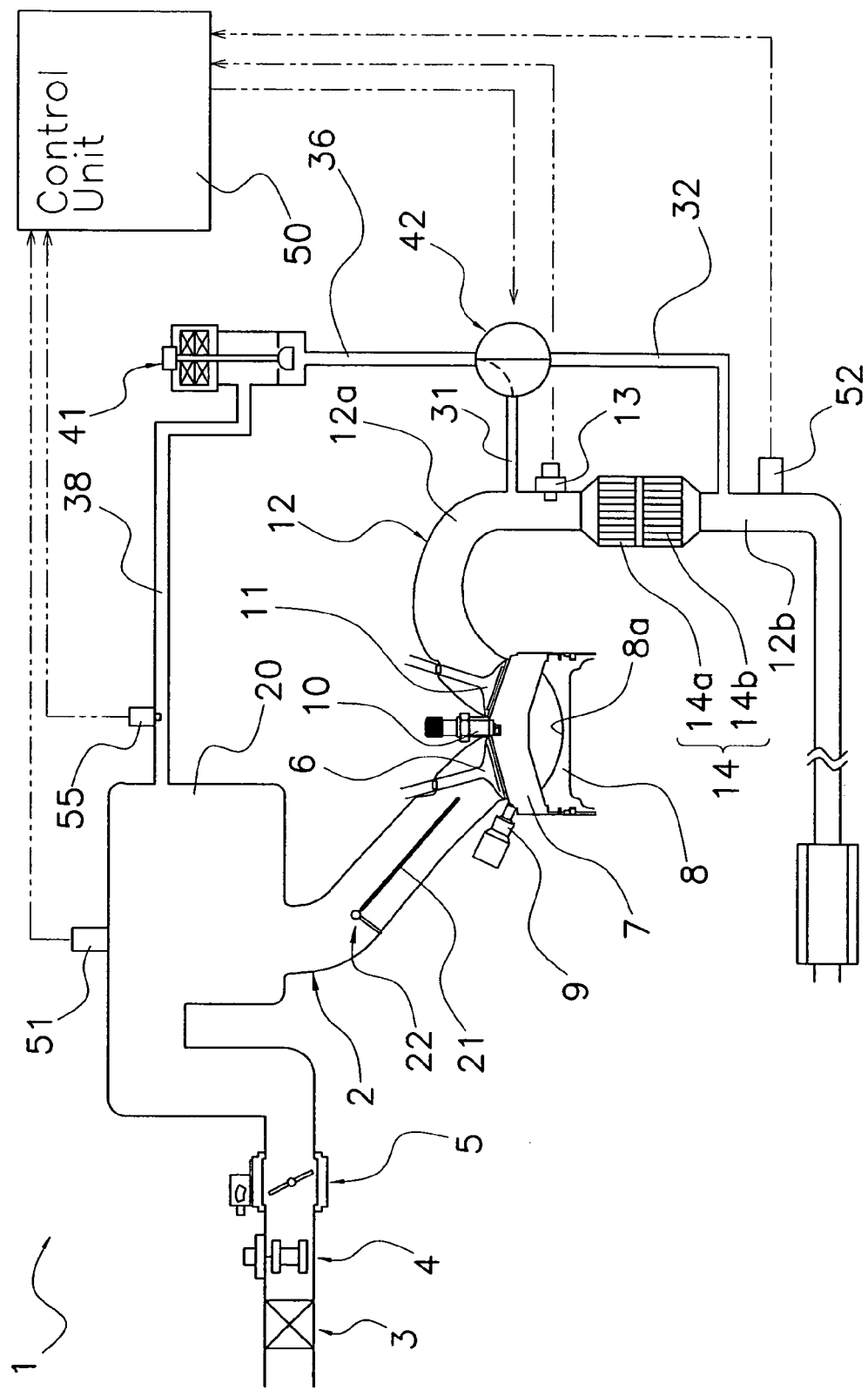
FIG. 10 is a schematic view of the internal combustion engine with an exhaust gas recirculation system illustrated in FIG. 1, but with the addition of a temperature sensor in accordance with a variation of the first embodiment of the present invention.

In the previously described embodiment, the control steps that are executed in order to prevent the intake manifold 20 from being damaged by the heat of the recirculated exhaust gas involve comparing the maximum allowable temperature Tmax of the intake manifold 20 to an estimated recirculated exhaust gas temperature that is based on the rotational speed of the engine 1, the load of the engine 1, and the quantity (flow rate) of the recirculated exhaust gas. It is also acceptable to measure the actual recirculated exhaust gas temperature instead of estimating the recirculated exhaust gas temperature and configure the control unit 50 such that the measured temperature value is used as the parameter for controlling the two-way selector valve 42. As shown in FIG. 10, a temperature sensor 55 can be provided in the shared recirculation passage 38 between the EGR flow regulating valve 41 and the intake manifold 20 to measure the temperature of the recirculated exhaust gas flowing to the intake manifold 20 and the measured temperature value can be fed to the control unit 50. In this way, the control unit 50 can monitor the actual temperature of the recirculated exhaust gas and instruct the two-way selector valve 42 from a state in which the exhaust gas for recirculation is drawn from the downstream section 12b of the exhaust passage 12 to a state in which the exhaust gas for recirculation is drawn from the upstream section 12a when the measured temperature approaches the maximum temperature that the intake manifold 20 can withstand. This arrangement makes it possible to conduct exhaust gas recirculation up to higher loads and higher engine speeds than can be done when the system is controlled using an estimated recirculated exhaust gas temperature.

In the previously described embodiment, the estimated recirculated exhaust gas temperature is computed based on the rotational speed of the engine 1, the load of the engine 1, and the quantity (flow rate) of the recirculated exhaust gas. It is also acceptable, however, to compute the estimated recirculated exhaust gas temperature in a more simplified manner based on the load of the engine 1 or the load and rotational speed of the engine 1. That is, in view of the fact that the temperature of the recirculated exhaust gas increases as the load and rotational speed of the engine 1 increase, the exhaust gas recirculation system can be configured to switch from drawing the exhaust gas for recirculation from the downstream section 12b to drawing the exhaust gas for recirculation from the upstream section 12a when the engine 1 enters a prescribed region of high loads and high rotational speeds.

Although the previously described embodiment is provided with the control step S5 of FIG. 4 in order to protect the resin intake manifold 20 from high-temperature recirculated exhaust gas, there are case in which the intake manifold is made of aluminum instead of resin and it is the EGR flow regulating valve 41 that needs protecting. In such a case, it is feasible for the control unit 50 to control the two-way selector valve 42 based on a maximum allowable temperature that is determined in consideration of the maximum temperature that the EGR flow regulating valve 41 can withstand instead of the maximum temperature that the intake manifold can withstand.

In the previously described embodiment, as shown in FIG. 4, the state of the two-way selector valve 42 is controlled using a step S2 in which it is determined if the pressure difference between the exhaust passage 12 and the intake passage 2 is equal to or larger than a prescribed pressure value that is fixed regardless of the operating conditions and a step S3 in which it is determined if the required exhaust gas quantity is equal to or larger than a prescribed quantity. Instead, it is also acceptable to prepare a map of the required pressure difference (pressure difference between the exhaust passage 12 and the intake passage 2) versus the required recirculated exhaust gas quantity and use the map to determine the pressure difference required to obtain the required quantity of recirculated exhaust gas. Then, the control sequence of FIG. 4 can be configured such that the control unit 50 proceeds to step S5 when the actual pressure difference is larger than the pressure difference obtained from the map and to step S4 when the actual pressure difference is less than the pressure difference obtained from the map, and the two-way selector valve 42 can be controlled accordingly.

In an exhaust gas recirculation system (for an internal combustion engine) in accordance with the present invention, the default state is a state in which exhaust gas that has passed through the catalytic converter and has a comparatively high cleanliness level is recirculated via the second recirculation passage. When there is the possibility that heat will damage the intake passage and other components, a state in which exhaust gas that has not yet passed through the catalytic converter and has a comparatively low temperature is recirculated to the intake passage through the first recirculation passage is used. As a result, a large amount of exhaust gas can be recirculated to the intake passage while reducing contamination of the inside of the intake passage caused by the recirculated exhaust gas and preventing damage to the intake passage caused by the heat of the recirculated exhaust gas.

As used herein to describe the present invention, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-426653. The entire disclosure of Japanese Patent Application No. 2003-426653 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An exhaust gas recirculation system for an internal combustion engine comprising:
    an exhaust passage equipped with a catalytic converter;
    a first recirculation path extending from an upstream section of the exhaust passage positioned upstream of the catalytic converter to an intake passage;

a second recirculation path extending from a downstream section of the exhaust passage positioned downstream of the catalytic converter to the intake passage;

a switching mechanism configured and arranged to selectively switch between a first recirculation state in which exhaust gas recirculation occurs via the first recirculation path and a second recirculation state in which exhaust gas recirculation occurs via the second recirculation path; and a control unit configured to control switching between the first recirculation state and the second recirculation state by the switching mechanism based on at least one parameter that correlates with exhaust gas temperature of the exhaust gas to be recirculated back to the intake passage, the control unit being configured to control the switching mechanism to fluidly connect the first recirculation path between the upstream section of the exhaust passage and the intake passage, and disconnect the second recirculation path when the exhaust gas temperature of the recirculated exhaust gas is determined to exceed a prescribed value.

2. The exhaust gas recirculation system recited in claim 1, wherein the exhaust passage includes at least one additional catalytic converter; and the upstream section of the exhaust passage is located upstream of the catalytic converter that is located farthest upstream among the catalytic converters.

3. The exhaust gas recirculation system recited in claim 1, wherein the switching mechanism is configured to selectively open and close the first recirculation path and the second recirculation path.

4. The exhaust gas recirculation system recited in claim 1, further comprising a temperature sensor configured produce a signal indicative of a detected temperature of the recirculated exhaust gas; and the control unit is further configured to correlate the exhaust gas temperature of the recirculated exhaust gas based on a temperature value detected by the temperature sensor.

5. The exhaust gas recirculation system recited in claim 1, wherein the control unit is further configured to correlate the exhaust gas temperature of the recirculated exhaust gas based on a rotational speed of the internal combustion engine, and an operating load of the internal combustion engine.

6. The exhaust gas recirculation system recited in claim 1, wherein the control unit is configured to selectively conduct and cease recirculation of the exhaust gas based on a rotational speed of the internal combustion engine and an operating load of the internal combustion engine.

7. The exhaust gas recirculation system recited in claim 1, wherein the control unit is further configured to correlate the exhaust gas temperature of the recirculated exhaust gas based on a rotational speed of the internal combustion engine, an operating load of the internal combustion engine, and a required quantity of the recirculated exhaust gas.

8. The exhaust gas recirculation system recited in claim 1, wherein the control unit is configured to control the switching mechanism to fluidly connect the first recirculation path between upstream section of the exhaust passage and the intake passage, and disconnect the second recirculation path when a pressure differential between the intake and exhaust passages is determined to be below a prescribed pressure value and a required quantity of the recirculated exhaust gas is determined to exceed a prescribed value.

9. An exhaust gas recirculation system for an internal combustion engine comprising:

an exhaust passage equipped with a catalytic converter;

a first recirculation path extending from an upstream section of the exhaust passage positioned upstream of the catalytic converter to an intake passage;

a second recirculation path extending from a downstream section of the exhaust passage positioned downstream of the catalytic converter to the intake passage;

a switching mechanism configured and arranged to selectively switch between a first recirculation state in which exhaust gas recirculation occurs via the first recirculation path and a second recirculation state in which exhaust gas recirculation occurs via the second recirculation path; and a control unit configured to control switching between the first recirculation state and the second recirculation state by the switching mechanism based on at least one parameter that correlates with exhaust gas temperature of the recirculated exhaust gas back to the intake passage, the control unit being further configured to correlate the exhaust gas temperature of the recirculated exhaust gas based on a rotational speed of the internal combustion engine, an operating load of the internal combustion engine, and a required quantity of the recirculated exhaust gas.

10. The exhaust gas recirculation system recited in claim 9, wherein the exhaust passage includes at least one additional catalytic converter; and the upstream section of the exhaust passage is located upstream of the catalytic converter that is located farthest upstream among the catalytic converters.

11. An exhaust gas recirculation system for an internal combustion engine comprising:

an exhaust passage equipped with a catalytic converter;

a first recirculation path extending from an upstream section of the exhaust passage positioned upstream of the catalytic converter to an intake passage;

a second recirculation path extending from a downstream section of the exhaust passage positioned downstream of the catalytic converter to the intake passage;

a switching mechanism configured and arranged to selectively switch between a first recirculation state in which exhaust gas recirculation occurs via the first recirculation path and a second recirculation state in which exhaust gas recirculation occurs via the second recirculation path; and a control unit configured to control switching between the first recirculation state and the second recirculation state by the switching mechanism based on at least one parameter that correlates with exhaust gas temperature of the recirculated exhaust gas back to the intake passage, the control unit being configured to control the switching mechanism to fluidly connect the first recirculation path between upstream section of the exhaust passage and the intake passage, and disconnect the second recirculation path when a pressure differential between the intake and exhaust passages is determined to be below a prescribed pressure value and a required quantity of the recirculated exhaust gas is determined to exceed a prescribed value.

12. The exhaust gas recirculation system recited in claim 11, further comprising
a temperature sensor configured produce a signal indicative of a detected temperature of the recirculated exhaust gas; and
the control unit is further configured to correlate the exhaust gas temperature of the recirculated exhaust gas based on a temperature value detected by the temperature sensor.

13. The exhaust gas recirculation system recited in claim 11, wherein
the control unit is further configured to correlate the exhaust gas temperature of the recirculated exhaust gas based on a rotational speed of the internal combustion engine, and an operating load of the internal combustion engine.

14. The exhaust gas recirculation system recited in claim 11, wherein
the control unit is configured to selectively conduct and cease recirculation of the exhaust gas based on a rotational speed of the internal combustion engine and an operating load of the internal combustion engine.

15. The An exhaust gas recirculation system for an internal combustion engine comprising:
an exhaust passage equipped with a catalytic converter;
a first recirculation path extending from an upstream section of the exhaust passage positioned upstream of the catalytic converter to an intake passage;
a second recirculation path extending from a downstream section of the exhaust passage positioned downstream of the catalytic converter to the intake passage;
a switching mechanism configured and arranged to selectively switch between a first recirculation state in which exhaust gas recirculation occurs via the first recirculation path and a second recirculation state in which exhaust gas recirculation occurs via the second recirculation path; and
a control unit configured to control switching between the first recirculation state and the second recirculation state by the switching mechanism based on at least one parameter that correlates with exhaust gas temperature of the recirculated exhaust gas to the intake passage,
the control unit being configured to control the switching mechanism to fluidly connect the second recirculation path between downstream section of the exhaust passage and the intake passage, and disconnect the first recirculation path when a pressure differential between the intake and exhaust passages, is equal to or above a prescribed pressure value and the exhaust gas temperature of the recirculated exhaust gas is determined to exceed a prescribed value.

16. The exhaust gas recirculation system recited in claim 15, wherein
the control unit is configured to selectively conduct and cease recirculation of the exhaust gas based on a rotational speed of the internal combustion engine and an operating load of the internal combustion engine.

17. The exhaust gas recirculation system recited in claim 15, wherein
the control unit is configured to control the switching mechanism to fluidly connect the first recirculation path between upstream section of the exhaust passage and the intake passage, and disconnect the second recirculation path when a pressure differential between the intake and exhaust passages is determined to be below a prescribed pressure value and a required quantity of the recirculated exhaust gas is determined to exceed a prescribed value.

18. An exhaust gas recirculation system for an internal combustion engine comprising:
exhaust gas conveying means for conveying exhaust gas from a combustion chamber;
exhaust gas purifying means for cleaning the exhaust gas flowing through the exhaust gas conveying means;
exhaust gas recirculation means for selectively conveying exhaust gas to an intake passage from one of an upstream position of the exhaust gas purifying means and a downstream position of the catalytic converter to the intake passage; and
control means for selectively switching between a first recirculation state in which exhaust gas recirculation occurs prior to the exhaust gas purifying means and a second recirculation state in which exhaust gas recirculation occurs after the exhaust gas purifying means based on at least one parameter that correlates with exhaust gas temperature of the recirculated exhaust gas back to the intake passage, the control means further including a function for controlling the exhaust gas recirculation means to selectively convey the exhaust gas from the upstream position of the exhaust gas purifying means to the intake passage when the exhaust gas temperature of the recirculated exhaust gas is determined to exceed a prescribed value.

19. An exhaust gas recirculation method for an internal combustion engine comprising:
conveying exhaust gas from a combustion chamber through an exhaust passage;
cleaning the exhaust gas flowing through the exhaust passage by using a catalytic converter;
selectively conveying exhaust gas to an intake passage from one of an upstream position of the catalytic converter and a downstream position of the catalytic converter to the intake passage based on at least one parameter that correlates with exhaust gas temperature of the recirculated exhaust gas back to the intake passage;
selectively conveying the exhaust gas from the upstream position of the catalytic converter to the intake passage when the exhaust gas temperature of the recirculated exhaust gas is determined to exceed a prescribed value.

* * * * *